United States Patent
Zeitler et al.

(10) Patent No.: US 7,626,176 B2
(45) Date of Patent: Dec. 1, 2009

(54) X-RAY DETECTOR WITH IN-PIXEL PROCESSING CIRCUITS

(75) Inventors: Gunter Zeitler, Aachen (DE); Gereon Vogtmeier, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 134 days.

(21) Appl. No.: 11/908,296

(22) PCT Filed: Mar. 10, 2006

(86) PCT No.: PCT/IB2006/050763

§ 371 (c)(1), (2), (4) Date: Sep. 11, 2007

(87) PCT Pub. No.: WO2006/097882

PCT Pub. Date: Sep. 21, 2006

(65) Prior Publication Data

US 2008/0277588 A1   Nov. 13, 2008

(30) Foreign Application Priority Data

Mar. 16, 2005   (EP)   ................... 05102082

(51) Int. Cl.
G01T 1/20   (2006.01)
(52) U.S. Cl. ................................. 250/370.11
(58) Field of Classification Search ............. 250/370.11
See application file for complete search history.

(56) References Cited

U.S. PATENT DOCUMENTS

| | | | |
|---|---|---|---|
| 4,910,405 A * | 3/1990 | Suzuki et al. | ............... 250/368 |
| 5,572,034 A | 11/1996 | Karellas | |
| 6,750,456 B1 | 6/2004 | Majewski et al. | |
| 7,115,875 B1 * | 10/2006 | Worstell | ................. 250/363.03 |
| 2004/0179645 A1 | 9/2004 | Hoffman et al. | |

FOREIGN PATENT DOCUMENTS

| | | | |
|---|---|---|---|
| EP | 0378896 A2 | 7/1990 |
| EP | 0534683 A2 | 3/1993 |
| EP | 1148349 A1 | 10/2001 |
| EP | 1396733 A1 | 3/2004 |
| JP | 57163885 A | 10/1982 |
| JP | 02213794 A | 8/1990 |
| JP | 04303786 A | 10/1992 |
| JP | 07181264 A | 7/1995 |
| JP | 08005747 A | 1/1996 |
| JP | 2003035777 A | 2/2003 |
| JP | 2003121552 A | 4/2003 |
| WO | 0065375 A1 | 4/2000 |
| WO | 03096070 A1 | 11/2003 |

* cited by examiner

*Primary Examiner*—David P Porta
*Assistant Examiner*—Mindy Vu

(57) ABSTRACT

The invention relates to an X-ray detector with an array of pixels (10) that are composed of a scintillation layer (11), a coupling layer (12), and a sensitive layer (13). The coupling layer (12) comprises light guiding units (17) and shielding units (16), wherein the shielding units (16) are disposed above electronic processing circuits (15a, 15b) that are susceptible to disturbances by X-radiation. In an alternative embodiment, the coupling layer comprises a material like lead-glass that is transparent for light and absorbing for X-radiation. Preferably a wavelength-shifting material incorporated into the coupling layer (12) shifts the wavelength ($\lambda_1$) of the photons generated in the scintillation layer (11) to values ($\lambda_2$) at which the sensitive layer (13) has a higher sensitivity.

20 Claims, 2 Drawing Sheets

X-RAY DETECTOR WITH IN-PIXEL PROCESSING CIRCUITS

The invention relates to an X-ray detector with a sensitive layer of detector elements (pixels) that comprise a processing circuit which is susceptible to disturbances by X-radiation. Moreover, it comprises a method for the production of such X-ray detectors. The invention also relates to a medical imaging device having such a detector.

X-ray detectors with a sensitive layer or array of detector elements are for example used in Computed Tomography (CT) scanners. In X-ray detectors of the so-called "indirect conversion type", a scintillation layer is provided above the sensitive layer for converting incident X-rays into photons of visible light that can then be converted into electrical signals by sensor units in the sensitive layer. In many modern detectors, the post-processing of said electrical signals (amplification, filtering etc.) is to a large part accomplished by "in-pixel" processing circuits, i.e. electronic circuits that are immediately integrated into each detector element (pixel). A problem of this approach is, however, that said processing circuits typically comprise components which are susceptible to interference from or even damage by X-radiation. The processing circuits of common X-ray detectors have therefore been placed under strips of a shielding material (e.g. lead) that are disposed between single scintillator crystals of a structured scintillation layer.

Based on this situation it was an object of the present invention to provide an X-ray detector with in-pixel processing circuits that has an improved sensitivity.

This object is achieved by an X-ray detector according to claim 1 and a method according to claim 13. Preferred embodiments are disclosed in the dependent claims.

The X-ray detector of the present invention comprises the following components:

a) A sensitive layer with detector elements (pixels), wherein each of said detector elements comprises (i) a light sensitive sensor unit for the conversion of incident light photons into an electrical signal, and (ii) a processing circuit for processing said electrical signal. The processing circuit is at least in part susceptible to interferences (e.g. disturbances, damage) by X-radiation. In a typical case, the detector elements are arranged in the sensitive layer as an array in a regular pattern.

b) A scintillation layer for the conversion of incident X-radiation into light photons which can be detected by the aforementioned sensor units. The scintillation layer is typically arranged parallel to and "in front of" (with respect to the propagation of the X-rays) the sensitive layer.

c) A coupling layer that is disposed between the scintillation layer and the sensitive layer. Moreover, the coupling layer is adapted to guide light from the scintillation layer to at least one of the aforementioned sensor units and to protect at least one of the aforementioned processing circuits from X-radiation. Particular embodiments of such a coupling layer will be discussed in more detail below.

The guidance of light in item c) typically implies that more than 50%, preferably more than 90%, most preferably more than 95% of the light entering the coupling layer will leave it towards the sensor unit. Similarly, the term "protection" typically implies that the amount of X-radiation is reduced by the coupling layer by more than 50%, preferably more than 90%, most preferably more than 95%.

In an X-ray detector of the aforementioned kind, the vulnerable processing circuits in the sensitive layer are effectively protected from X-radiation by the additional coupling layer, and no shielding material needs to be integrated into the scintillation layer. The scintillation layer can therefore be maximally filled with scintillation material, thus providing a maximal conversion of incident X-radiation into photons. The additional distance between the scintillation layer and the sensitive layer is optically bridged by the coupling layer which lead photons from the scintillation layer to the sensor units (similar applications of light guiding units are for example known from EP 378 896 A2, US 2004/0179645 A1, and WO 03/096070 A1).

In a first particular design type of the X-ray detector, the coupling layer comprises at least two kinds of components, namely (i) light guiding units for guiding light from the scintillation layer to the sensor units, and (ii) shielding units for protecting the processing circuits in the sensitive layer from X-radiation. To achieve the desired functionality, the light guiding units will consist of a transparent material, for example a suitable polymer or a glue. The shielding units will comprise (up to 100%) a material with a high absorption coefficient for X-radiation, for example Pb, W, Mo, Ta, Ti, $BaSO_4$, $BaCO_3$, BaO, $PbCO_3$, $PbCl_2$, $PbSO_4$, $TiO_2$ and/or ZnO. The light guiding units and the shielding units preferably extend from the bottom to the top of the coupling layer and are arranged adjacent to each other in a gapless way.

The area of the light guiding units that faces the scintillation layer and collects photons generated in there is preferably larger than the (opposite) area of the light guiding units that faces the sensor units and from which photons leave the coupling layer towards the sensitive layer. Thus the light guiding units have a kind of collimating or bundling effect, collecting light in a large area and emitting it in a smaller one. The light guiding units are preferably designed such that approximately all light energy entering them from the scintillation layer will (possibly after a wavelength-shift) leave them again towards the sensor units. This may for example be achieved by a spatially varying refractive index of the light guiding units that provides them with a behavior like a focusing lens, by a special shape of the light guiding units and/or by reflective coatings on all surfaces other than the light input/output areas.

The shielding units preferably have a cross section that is tapered in a direction pointing from the sensitive layer towards the scintillation layer, for example a triangular cross section. Such shielding units can be arranged above the sensitive processing circuits with a broad base that gets smaller and smaller towards the scintillation layer. The shielding units thus have a small or even zero area at the side of the coupling layer facing the scintillation layer, leaving a maximal area for the light guiding units and the collection of photons from the scintillator. Moreover, shielding units with a triangular or similar cross section can be produced rather easy as prisms, for example by extrusion (molding) processes.

To achieve their function, the shielding units have to be disposed above the processing circuits of the sensitive layer, and thus their geometrical arrangement will in general correspond to the distribution of the processing circuits. The shielding units may however also cover areas of the sensitive layer in which no processing circuits (but perhaps other sensitive components) are arranged; similarly, electronic components of the sensitive layer that are resistant to X-radiation may be disposed in places not protected by the shielding units. In a preferred arrangement, the shielding units encircle the light guiding units of the coupling layer. Such an encirclement has the advantage that the shielding units prevent crosstalk between neighboring light guiding units, i.e. the transition of photons from one light guiding unit to an adjacent one.

The interfaces between the light guiding units and the shielding units preferably comprise a reflective material, for example a white paint with particles of e.g. titanium dioxide. Photons that tend to leave the light guiding units in the direction of the shielding units are then reflected and do not produce crosstalk or are even lost for the measurement.

In a second particular design type of the X-ray detector, the coupling layer comprises a material that is transparent for light and at the same time highly absorbing for X-radiation. The material typically has an absorption coefficient for light (wavelength 400 nm to 800 nm) of less than 0.03 $cm^{-1}$ (and preferably less than 0.01 $cm^{-1}$ above 700 nm), and an attenuation coefficient for X-radiation (wavelength 0.005 nm (250 keV) to 0.1 nm (10 keV)) of more than 3 $cm^{-1}$ below 250 keV (and preferably more than 500 $cm^{-1}$ at 10 keV). With such a material, the whole sensitive layer can be protected from X-radiation while simultaneously the passage of scintillation light to the sensor units is not impeded. In a preferred embodiment, the coupling layer above a detector element consists completely and preferably in one piece of the material and thus needs no additional and complicated structuring.

The material of the aforementioned second design may particularly comprise lead-glass (i.e. a "normal" glass containing lead) and/or lead-fluoride. The lead-glass can for example be potassium silicate glass impregnated with lead oxide from about 10% to 40% by weight.

In a further development of the X-ray detector, the coupling layer comprises at least one wavelength-shifting material which by definition is adapted to absorb photons of a first wavelength and to reemit them at a different second wavelength. The material may particularly comprise a fluorescent dye like POPOP. The spectrum of photons generated in the scintillation layer will then (at least partially) be transformed according to the characteristics of the wavelength-shifting material. This effect can be exploited in such a way that the reemitted photons lie in a spectral range in which the sensor units have a higher sensitivity, thus increasing the overall sensitivity of the X-ray detector. The coupling layer may optionally comprise two or more wavelength-shifting materials operating in a cascade, i.e. photons emitted by one material at a second wavelength are absorbed by another material and reemitted at a further shifted third wavelength and so on. In this way the wavelength of the photons reaching the sensor units can be shifted step-by-step to a desired range.

The scintillation layer may consist of a continuous sheet of material. In a preferred embodiment, the scintillation layer is however subdivided into scintillation elements or crystals, each of which is associated as a "pixel" with a corresponding detector element in the sensitive layer and separated from neighboring scintillation elements by one or more reflective interfaces. The reflective interfaces reflect photons back into the scintillation elements and thus prevent their loss and a crosstalk. In addition, reflective material may cover the top of the scintillation layer (input for X-rays). The structuring of the scintillation layer into pixels has the advantage that electrical signals produced by the detector elements can more reliably be assigned to a certain area in the scintillation layer, thus improving the spatial resolution of the detector.

The invention further relates to a method for the production of an X-ray detector of the kind described above. The method comprises (among others) of the following steps:
a) The attachment of a plate of light guiding material to a plate of a scintillator material. The plates may for example be glued together.

b) The structuring of the resulting combination of light guiding plate and scintillator plate into single scintillator elements corresponding to single pixels.

The advantage of such a method is that the scintillation layer and the coupling layer are together structured into single elements, such that no separate steps are needed and problems with a mismatch between the scintillator elements and light guiding units are avoided.

The invention also relates to a medical imaging device in which a detector according to the invention as described by claim 1 is used.

These and other aspects of the invention will be apparent from and elucidated with reference to the embodiment(s) described hereinafter.

In the following the invention is described by way of example with the help of the accompanying drawings in which.

In state of the art Computed Tomography (CT), scintillator pixel-elements mounted on Si-photodiodes or on top of both a CMOS photodiode and an integrated radiation sensitive in-pixel-electronics are used as X-ray detectors. Currently, the electronics is protected from X-ray radiation by lead spacers between neighboring scintillator elements. This technique is expensive with respect to production, structuring and mounting and has the disadvantage of leading to a suboptimal DQE (Detective Quantum Efficiency). One alternative method for shielding of electronics is to use the scintillator material itself. Since this has to be thick enough in order to provide sufficient X-ray absorption, this may in contrary severely affect the light-output and thus the efficiency due to a reduced light transparency (in addition, a thicker layer is also much more expensive). If the scintillator material cannot be provided with a thickness big enough for sufficient shielding, a certain amount of X-ray radiation passes through this material without any interaction and leads in turn to radiation damage of photodiode and especially of the less radiation hard CMOS electronics. In the X-ray detectors of the present invention, additional shielding (e.g. lead or tungsten) at least for the electronics will therefore be mounted on top of the electronics—which is geometrically at the same level as the photodiode—, and the gap between two shielding blocks will be filled with transparent material (e.g. a special transparent glue or a plastic layer). This transparent material should have a special shape to guarantee an efficient light-guiding behavior for photons leaving the scintillator. Very crucial is particularly the space orientation and shape of the interface between shielding and transparent material. Preferred embodiments of this approach will now be discussed in more detail with reference to the Figures.

Figure 1:
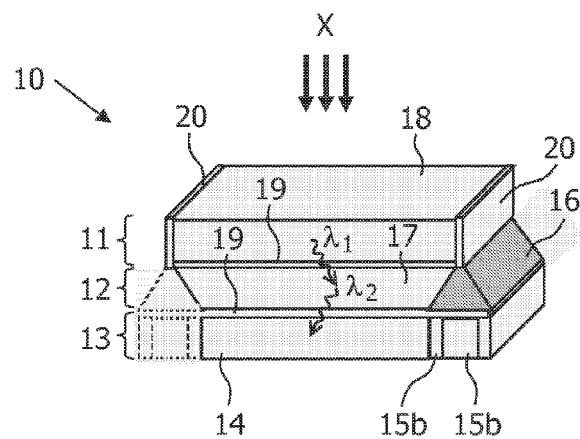
FIG. 1 is a perspective view of one pixel according to a first embodiment of the invention.
Figure 2:
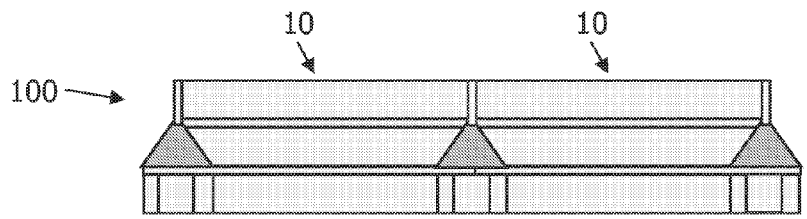
FIG. 2 is a schematic side view of an X-ray detector with pixels according to FIG. 1.

FIGS. 1 and 2 schematically show the design of an X-ray detector 100 with pixels 10 according to a first embodiment of the present invention. The pixels 10 are basically composed of the following three layers 11, 12, and 13 which are attached to each other by intermediate layers of glue 19:

A scintillation layer 11 consisting of single scintillation elements or crystals 18 (e.g. CWO or GOS). Each scintillator element 18 is separated from neighboring scintillator elements by reflective separators 20 which may for example consist of particles of titanium dioxide ($TiO_2$). X-rays X impinging on the scintillation elements 18 are converted into photons of light with a wavelength $\lambda_1$. The reflective separators 20 prevent such photons from passing into adjacent scintillator elements 18, thus inhibiting crosstalk in the scintillation layer 11 without loss of signals. The top surface of the scintillation elements 18 may also be covered with a reflective and X-ray transparent layer (not shown) to prevent the loss of photons to this side.

A coupling layer 12 consisting of shielding units 16 and light guiding units 17 which together fill the coupling layer 12 in a gapless way. In the embodiment shown in FIGS. 1 and 2, the shielding units 16 are shaped as prisms with the cross section of a isosceles triangle, the base of which resides in the lower surface of the coupling layer 12, while the tip of the shielding units 16 is positioned below the reflective separators 20 of the scintillation layer 11. The shielding units 16 consist of a material with a high absorption coefficient for X-radiation, for example of lead or tungsten. In the shielding units 16 such X-ray quanta are absorbed, which passed through the scintillator material without any interaction (e.g. this number is 5% to 20% between 100 and 120 keV for GOS with a thickness of 1.5 mm).

The light guiding units 17 consist of a transparent, light guiding material like plastics (e.g. polymethyl methacrylate PMMA), transparent glues or amorphous materials (e.g. lead-glass, which has the additional advantage of being highly X-ray absorbing and thus providing intrinsically a shielding effect) and/or photoresists like SU8 or similar materials. The aforementioned materials have a 100% transmittance for photons above 400 nm, i.e. their transmission spectra match with the photon emission spectrum of a usual scintillator ideally.

A sensitive layer 13 which is typically formed on a silicon substrate and which comprises for each pixel 10 a sensor unit 14 and adjacent thereto a processing circuit 15a, 15b. The sensor units 14 may be realized by a photodiode and are adapted to convert photons of visible light into electrical signals. Said electrical signals are then preprocessed (amplified, filtered, distributed to readout lines etc.) by the processing circuits 15a, 15b which may for example be realized in CMOS technique.

The processing circuits 15a, 15b are arranged below the shielding units 16 of the coupling layer 12. More particularly, parts 15b of the processing circuits that are more susceptible to interference or damage by X-radiation are arranged below regions of the shielding units 16 with a high effective thickness, while more radiation hard parts 15a of the processing circuits are arranged below thinner regions of the shielding units 16.

In the described design of the X-ray detector 100, the processing circuits 15a, 15b are securely protected from X-radiation X. As the shielding units 16 are arranged in an extra layer 12 and not in the scintillation layer 11, their volume does not reduce the volume of the scintillator material which can therefore fill the whole scintillation layer 11 and collect a maximal amount of X-radiation. The light photons generated in the scintillation layer 11 are all collected by the light guiding units 17 and led substantially without losses to the smaller sensor units 14. In this way the X-ray detector 100 achieves a high sensitivity and simultaneously a high robustness. During production, the design has the advantage that it is not necessary to structure the hard scintillator material for the accommodation of a shielding, which also avoids losses of scintillator material.

In the arrangement of FIGS. 1 and 2, the inclined plane between light guiding units 17 and the shielding units 16 is covered by a reflective material similar or identical to that of the separators 20 between the scintillator elements 18. In their geometrical surface dimensions the light guiding units 16 are similar to those of the scintillator (e.g. the size of the pixel). The thickness—which also determines the steepness of the inclined plane for a given base width of the shielding units 16—has to be chosen appropriately concerning optimized light-guiding properties of the transparent light guiding units 17 (steepness of inclined plane), the absorption efficiency of the shielding required, technical availability, and costs. Most promising are light-guides made of plastics or of transparent, bubble free glue with a high transparency for photons in the spectral range of the scintillator.

In a representative example the scintillator layer 11 may be assumed to be made of 2 mm GOS material, while the coupling layer 12 is chosen to be up to 2 mm thick. Calculations were performed that are based on a typical primary radiation energy flux density of $2.5 \cdot 10^8$ keV/(mA·s·mm$^2$) in 1 m distance to the focal spot, at 140 kV and an X-ray tube current of 400 mA. To evaluate the lifetime dose, $2 \cdot 10^6$ scans with 1 s each were assumed. For such a setup, a simulation calculation gives values for the radiation dose absorbed by the front of the CT detector pixel (scintillator) and the photodiode/electronic layer, respectively, as a function of the thickness and the characteristics of the material (lead, tungsten, PMMA) used in between. Results are summarized for comparison in the following table in terms of the energy dose [Gy] for different arrangements of materials.

TABLE 1

| | Radiation dose per pixel (lifetime) |
|---|---|
| GOS-scintillator (front) | 20125 kGy |
| Photodiode/electronic layer (front) with shielding of GOS-scintillator (2 mm) only | 3026 Gy |
| Photodiode layer (front) with shielding of GOS-scintillator (2 mm) and PMMA (2 mm) | 2922 Gy |
| Photodiode/electronic layer (front) with shielding of GOS-scintillator (2 mm) and lead (2 mm/1 mm/0.5 mm) | 1 Gy/22 Gy/185 Gy |
| Photodiode/electronic layer (front) with shielding of GOS-scintillator (2 mm) and tungsten (W) (2 mm/1 mm/0.5 mm) | 0.003 Gy/2 Gy/55 Gy |

Depending on the layout and the process technology, CMOS electronic is known to be radiation hard up to energy doses of a few hundreds of Gy. So, e.g. 0.5 mm thick lead as absorption material is sufficient for an effective shielding of less sensitive CMOS electronic parts. For highly sensitive electronics a 1-2 mm thick part of the proposed triangular shaped lead shielding units 16 seems to be sufficient.

The optical coupling efficiency—and thus the light yield—strongly depends on a proper matching of refractive indices of all materials involved in the optical transmission process (scintillator, glue, plastics or glue or lead-glass, photodiode). The refractive indices in the relevant wavelength regime (highest amount of optical scintillation photons is around 500 nm) are: 2.2 for a GOS scintillator, 1.5 for the glue used in current applications, 1.5 for PMMA and also about 1.5 for the photodiode. For a setup without a transparent coupling layer, the indices are therefore not matched ideally due to the fact that radiation resistant glue is not available with the best fitting index (which would be higher than 1.5). But since the refractive indices of PMMA and glue are similar, an additional layer of plastics material (e.g. PMMA) in the optical transmission line does not affect the optical coupling efficiency of the CT detector device.

The gap between two shielding units 16 of neighboring pixels can simply be filled with e.g. transparent glue as light-guide 17 after the alignment of the mesh of shielding blocks. A proper matching—which is necessary e.g. if one uses plastics as light-guide—is then automatically given. This makes gluing and mounting of the sandwich structure easier and cheaper.

In order to increase the sensitivity of the X-ray detector 100 of FIGS. 1 and 2 (and of detectors 200, 300 of FIGS. 3-6, too) even more, a wavelength-shifting material can be incorporated into the light guiding units 17. Such a material absorbs photons in the scintillation layer 11 at the wavelength $\lambda_1$ and reemits them a short time later at a second wavelength $\lambda_2$. The material may consist of a fluorescent dye dopant, which is normally embedded in base material formed by solid organic materials (polymers)—like polyvinyl toluene plastic, polymethyl methacrylate or polystyrene—which has good optical transparency in the relevant spectral range. Commercially available wavelength-shifters can be used, for example organic fluorescent dyes like Y11, O2, R3 (Kuraray Co., Ltd., Kurashiki, Japan), EJ280, EJ284 (Eljen technology, Sweetwater, Tex., USA), POPOP (1,4-Bis(5-phenyl-2-oxazolyl)benzene) or bis-MSB (1,4-Bis(2-methylstyryl)benzene), or anorganic fluorescent dyes like $SrGa_2S_4$:Eu, ZnS:Cu,Au or YaG:Ce.

Figure 7:
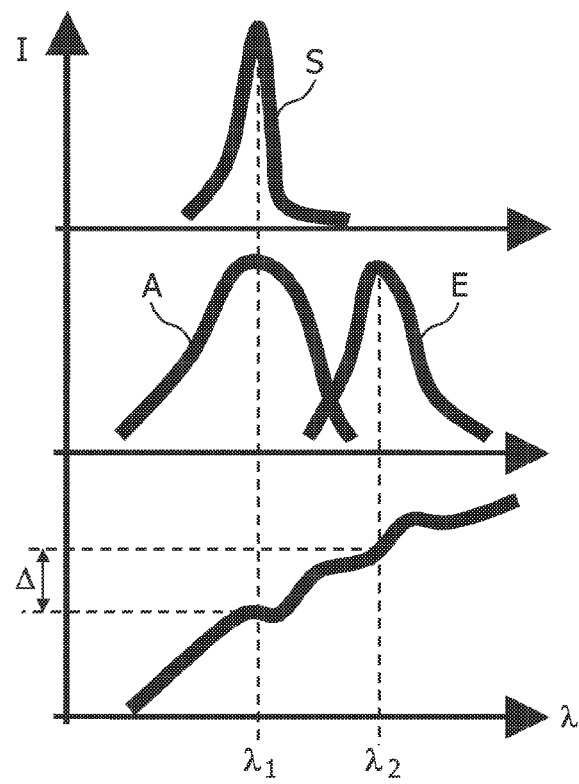
FIG. 7 is a diagram illustrating the effect of a wavelength-shifting material in the coupling layer.

The effect of a wavelength-shifting material is illustrated in FIG. 7. The upper diagram of FIG. 7 shows the spectral distribution of light intensity I emitted by the scintillation layer 11, wherein the curve S describes a peak around a first wavelength $\lambda_1$. The central diagram of FIG. 7 shows the spectral absorption characteristics (curve A) and emission characteristics (curve E) of a wavelength-shifting material disposed in the light guiding units 17. The absorption characteristics preferably has a peak at the same wavelength $\lambda_1$ as the emission spectrum of the scintillator, while the reemission maximum lies at a different wavelength $\lambda_2$. Typically, the emission wavelength $\lambda_2$ will be larger than the absorption wavelength, $\lambda_2 > \lambda_1$.

The lower curve in FIG. 7 illustrates the wavelength dependent sensitivity of a typical photodiode used as sensor unit 14 in the sensitive layer 13, wherein the sensitivity increases with increasing wavelength $\lambda$. Therefore, an improvement $\Delta$ of sensitivity can be achieved if the wavelength $\lambda_1$ emitted by the scintillation layer 11 is shifted to a larger wavelength $\lambda_2$.

The thickness and dopant concentration of the wavelength-shifting material has to be chosen appropriately concerning absorption efficiency, technical availability, and costs. In general, a wavelength shifter with a standard concentration of dopant, on polyvinyl toluene base and of 5 mm thickness, should ensure almost complete absorption of scintillation light. However, since all such scintillation photons, which are not absorbed and reemitted by the wavelength shifter material, can pass unhindered to the photodiode—since the base material has nearly 100% optical transmission in the wavelength regime under consideration—one not only never looses any light collection efficiency but in any case gains one through the wavelength shifting mechanism and the sensitivity spectrum of the photodiode. A promising wavelength shifter is e.g. Y11, which has fluorescence decay times of the order of a few ns (<10 ns), an absorption maximum around 470 nm and an emission spectrum in the range between 460 and 600 nm. In addition, it is advantageous that a block of plastics doped with wavelength shifting material is very radiation hard both with respect to optical transmission and wavelength shifting efficiency.

The light guiding units 17 might also contain two or more different wavelength-shifting materials which are chosen such that they shift the wavelength $\lambda_1$ of the scintillation layer 11 in several steps to a final wavelength that optimally fits to the sensitivity of the sensor units 14.

Since the production of a wavelength shifter can be based on plastic injection molding, casting or extrusion techniques, such a material is relatively cheap. Since scintillator and wavelength shifter can be produced with the same geometry, they can be glued as plates and be structured afterwards. Reflective coating can be applied for the glued structure then, both to improve light collection efficiency for scintillator and wavelength shifter.

The refractive indices in the relevant wavelength regime are: 2.2 for a GOS scintillator, 1.5 for the glue used in current applications, 1.6 for the wavelength shifter on polyvinyl toluene base and about 1.5 for the photodiode. Radiation resistant glue is not available with the best fitting index—which would be around 1.8. Since the refractive index of wavelength shifter base material is higher than the one of the glue, this is not crucial, especially with respect to the effect of total reflection and an efficient optical coupling.

Figure 3:
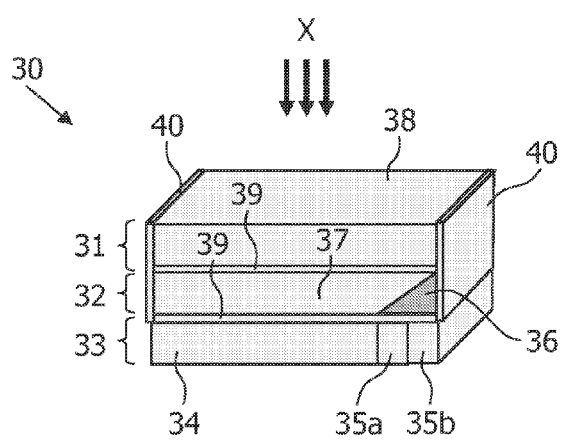
FIG. 3 is a perspective view of one pixel according to a second embodiment of the invention.
Figure 4:
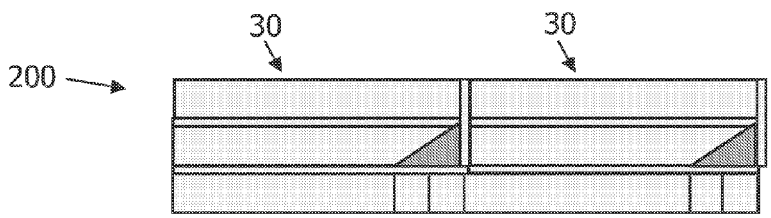
FIG. 4 is a schematic side view of an X-ray detector with pixels according to FIG. 3.

FIGS. 3 and 4 show an alternative design of an X-ray detector 200 and its pixels 30. The pixel 30 has in principle the same components as the pixel 10 of FIG. 1, wherein like components carry reference numbers augmented by +20 with respect to the reference numbers of FIG. 1. A detailed description of these components can therefore be omitted.

The difference between the designs of FIGS. 1/2 and 3/4 lies in the shape of the shielding units 16 and 36, respectively. In FIG. 3, the shielding units 36 have the cross section of a rectangular triangle, and the reflective separators 40 extend vertically through both the scintillation layer 31 and the coupling layer 32. The components of the pixel 30 are thus all arranged vertically below each other, giving the pixel 30 a cuboid shape and promoting the propagation of light into the direction of the photodiode. Each pixel 30 can be produced with the same geometry for the scintillator and the coupling layer 32. Thus they can be glued as plates—in case one uses plastics as light-guide—and be structured afterwards. Reflective coating can be applied for the glued structure then, both to improve light collection efficiency for scintillator and light-guide.

Figure 5:
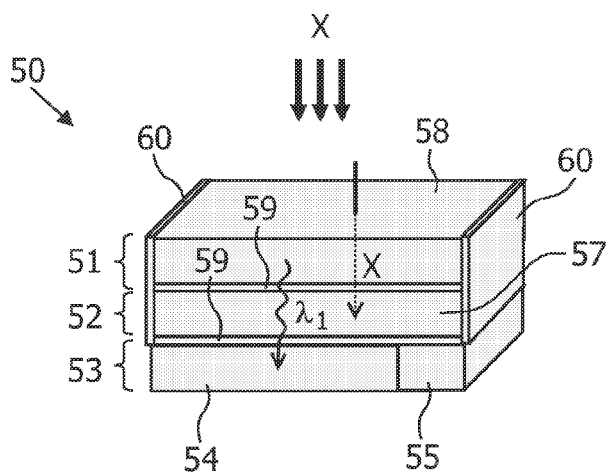
FIG. 5 is a perspective view of one pixel according to a third embodiment of the invention with an optically transparent and X-ray absorbing coupling layer.
Figure 6:
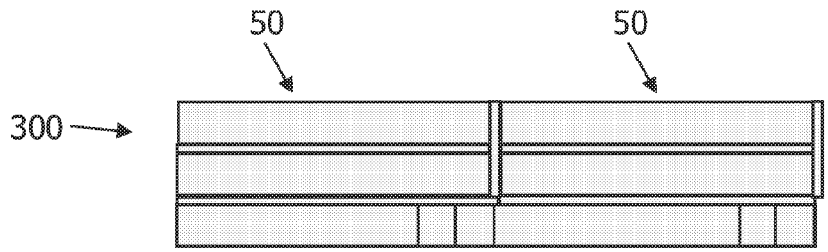
FIG. 6 is a schematic side view of an X-ray detector with pixels according to FIG. 5.

FIGS. 5 and 6 show a third design of an X-ray detector 300 and its pixels 50. The pixel 50 has in principle the same components as the pixel 10 of FIG. 1, wherein like components carry reference numbers augmented by +40 with respect to the reference numbers of FIG. 1. A detailed description of these components can therefore be omitted.

The crucial difference between the design of FIGS. 5 and 6 and the designs of FIGS. 1-4 is that the coupling layer 52 does not contain separate "light guiding units" and "shielding units" any more. Instead, the coupling layer 52 consists of homogenous blocks 57 of a light transparent and X-ray absorbing material, wherein each such block corresponds to a particular detector unit (i.e. a sensor unit 54 and a processing circuit 55). Moreover, each block 57 is separated from neighboring blocks by reflective separators 60 that traverse the scintillation layer 51 and the coupling layer 52 at right angles.

The blocks 57 guide the X-ray-generated optical photons $\lambda_1$ to the photodiode 54 and simultaneously absorb such X-ray quanta X which passed through the scintillator crystals 58 without any interaction. This means that the material below the scintillator acts as light-guide for optical photons and also as X-ray absorber. Thus, electronics and photodiode are radiation protected by this additional material layer in combination with the scintillator itself.

As material of the blocks 57 one can use amorphous glasses like lead-glass, or crystals like lead-fluoride. These materials have a relative high Z to absorb X-ray photons effectively and have approximately 100% transmittance for photons above 400 nm and 350 nm, respectively, for the required thickness of the block (up to 10 mm). The transmission spectra of the mentioned materials thus match with the photon emission spectrum of the scintillator ideally.

The blocks 57 are surrounded at the sidewalls by the same reflective layers 60 as the scintillator crystals 58 to ensure a high propagation of light in the direction of the photodiode. In its geometrical surface dimensions each block 57 is similar to that of the corresponding scintillator crystal 58 (e.g. the size of the pixel). The thickness of the blocks 57 has to be chosen appropriately concerning absorption efficiency, technical availability, and costs. Most promising is lead-glass, which has both a relative high absorption coefficient for the relevant energy range (<120 keV) and a high transparency for photons in the spectral range of the scintillator. Standard lead-glass compositions (e.g. Schott SF5, Schott AG, Mainz, Germany) with a thickness of e.g. 3 mm absorb photons with energies below 120 keV with 99% efficiency in average.

In a representative example the scintillator layer 51 may be assumed to be made of 2 mm GOS material, while the lead-glass layer 52 is chosen to be 2 and 3 mm thick, respectively. Calculations were performed that are based on a typical primary radiation energy flux density of $2.5 \cdot 10^8$ keV/(mA·s·mm$^2$) in 1 m distance to the focal spot, at an X-ray tube current of 400 mA. To evaluate the lifetime dose, $2 \cdot 10^6$ scans with 1 s each were assumed. For such a setup, a simulation calculation gives values for the radiation dose absorbed by the front of the CT detector pixel (scintillator), the lead-glass, and the photodiode/electronic layer, respectively. Results are summarized for comparison in the following table in terms of the energy dose [Gy] for different arrangements of materials (for additional data see table 1).

TABLE 2

|  | Radiation dose per pixel (lifetime) |
| --- | --- |
| GOS-scintillator (front) | 20.125 kGy |
| Lead-glass (front) with shielding of GOS-scintillator (2 mm) | 62 kGy |
| Photodiode/electronic layer (front) with shielding of GOS-scintillator (2 mm) and lead-glass (2 mm/3 mm) | 0.041 kGy/0.009 kGy |

The table shows that a setup with 2 or 3 mm thick lead-glass as absorption layer is sufficient for an effective shielding even of the most sensitive (CMOS) electronic blocks.

Consideration of the refractive indices (1.7 for the lead-glass Schott SF5) show that an additional layer of a material like lead-glass in the optical transmission line does not affect the optical coupling efficiency of the CT detector device.

One advantage of the embodiment shown in FIGS. 5 and 6 is that there is no need for an exact geometrical matching of the 'scintillator/lead-glass pixel' and the 'CMOS photodiode/electronic pixel' below. This makes gluing and mounting easier and cheaper. Since scintillator and lead-glass can be produced with same geometry, they can be glued as plates and be structured afterwards. Reflective coating can be applied for the glued structure then, both to improve light collection efficiency for scintillator and lead-glass.

Finally it is pointed out that in the present application the term "comprising" does not exclude other elements or steps, that "a" or "an" does not exclude a plurality, and that a single processor or other unit may fulfill the functions of several means. The invention resides in each and every novel characteristic feature and each and every combination of characteristic features. Moreover, reference signs in the claims shall not be construed as limiting their scope.

The invention claimed is:

1. An X-ray detector comprising an array of pixels, wherein a pixel comprises:
   a sensitive layer with a detector element that comprises a light sensitive sensor unit mounted on a substrate;
   a processing circuit, mounted on the substrate adjacent to the sensor unit, which is susceptible to interference by X-radiation;
   a scintillation layer for the conversion of incident X-radiation into photons; and
   a coupling layer comprised of at least one light guiding unit and at least one shielding unit that are disposed between the scintillation layer and the substrate of the same pixel; wherein the light guiding unit is adapted to guide light from the scintillation layer to the sensor unit and the shielding unit is adapted to protect the processing circuit in the same pixel from X-radiation.

2. The X-ray detector according to claim 1, wherein a first area of the light guiding unit facing the scintillation layer is larger than a second area of the light guiding unit facing the sensor unit.

3. The X-ray detector according to claim 1, wherein the shielding unit has a triangular cross section that is tapered in a direction pointing towards the scintillation layer.

4. The X-ray detector according to claim 1, wherein the shielding unit encircles the light guiding unit.

5. The X-ray detector according to claim 1, wherein the light guiding unit comprises PMMA, a glue, and SU8 photoresist.

6. The X-ray detector according to claim 1, wherein interfaces between the light guiding unit and the shielding unit comprise a reflective material with titanium dioxide.

7. The X-ray detector according to claim 1, wherein the coupling layer comprises a material that is transparent to light and highly absorbing to X-radiation.

8. The X-ray detector according to claim 7, wherein the coupling layer comprises lead-fluoride.

9. The X-ray detector according to claim 1, wherein the coupling layer comprises at least one wavelength-shifting material that is adapted to absorb photons of a first wavelength and to reemit them at a second wavelength.

10. The X-ray detector according to claim 9, wherein the wavelength-shifting material comprises a fluorescent dye including Y11, O2, R3, EJ280, EJ284, POPOP, bis-MSB, SrGa$_2$S$_4$:Eu, ZnS:Cu, Au or YaG:Ce.

11. The X-ray detector according to claim 1, wherein the scintillation layer is subdivided into scintillation elements, and a scintillation element is associated with a detector element in the sensitive layer and separated from neighboring scintillation elements by reflective interfaces.

12. A method for the production of an X-ray detector comprising an array of pixels, wherein a pixel is formed according to the steps of:

forming a sensitive layer with a detector element that comprises a light sensitive sensor unit mounted on a substrate;

mounting a processing circuit on the substrate adjacent to the sensor unit;

forming a scintillation layer for the conversion of incident X-radiation into photons; and forming a coupling layer comprised of at least one light guiding unit and at least one shielding unit that are disposed between the scintillation layer and the substrate of the same pixel;

wherein the light guiding unit is adapted to guide light from the scintillation layer to the sensor unit and the shielding unit is adapted to protect the processing circuit in the same pixel from X-radiation.

13. The method of claim 12, further comprising forming a first area of the light guiding unit facing the scintillation layer larger than a second area of the light guiding unit facing the sensor unit.

14. The method of claim 12, further comprising tapering a triangular cross section of the shielding unit in a direction pointing towards the scintillation layer.

15. The method of claim 12, further comprising encircling the light guiding unit with the shielding unit.

16. The method of claim 12, further comprising selecting a material for the light guiding unit including PMMA, a glue and SU8 photoresist.

17. The method of claim 12, further comprising selecting interfaces between the light guiding unit and the shielding unit as a reflective material with titanium dioxide.

18. The method of claim 12, further comprising selecting the coupling layer as material that is transparent to light and highly absorbing to X-radiation.

19. The method of claim 12, further comprising selecting the coupling layer as at least one wavelength-shifting material that is adapted to absorb photons of a first wavelength and to reemit them at a second wavelength.

20. A medical imaging device having an X-ray detector comprising an array of pixels, wherein a pixel comprises:

a sensitive layer with a detector element that comprises a light sensitive sensor unit mounted on a substrate;

a processing circuit, mounted on the substrate adjacent to the sensor unit, which is susceptible to interference by X-radiation;

a scintillation layer for the conversion of incident X-radiation into photons; and a coupling layer comprised of at least one light guiding unit and at least one shielding unit that are disposed between the scintillation layer and the substrate of the same pixel;

wherein the light guiding unit is adapted to guide light from the scintillation layer to the sensor unit and the shielding unit is adapted to protect the processing circuit in the same pixel from X-radiation.

* * * * *